Figure 1:
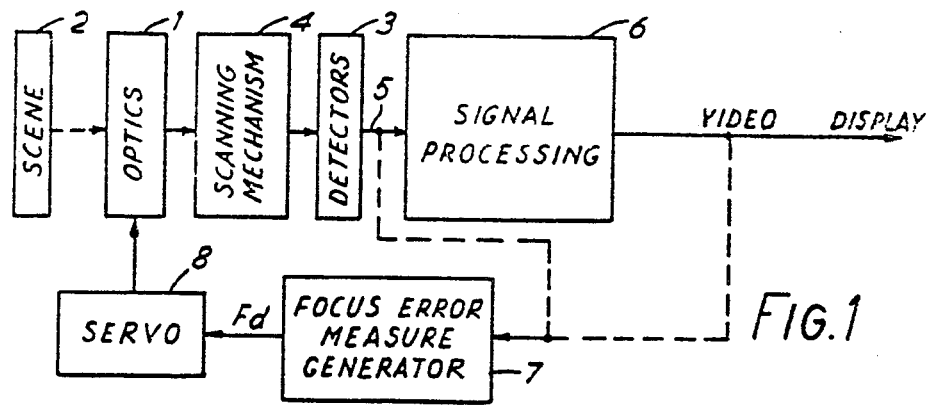

United States Patent [19]

Voles

[11] Patent Number: 4,458,145
[45] Date of Patent: Jul. 3, 1984

[54] AUTOMATICALLY FOCUSSED OPTICAL SYSTEM

[75] Inventor: Roger Voles, London, England

[73] Assignee: EMI Limited, Hayes, England

[21] Appl. No.: 328,540

[22] Filed: Dec. 8, 1981

[30] Foreign Application Priority Data

Dec. 10, 1980 [GB] United Kingdom ............... 8039145

[51] Int. Cl.³ .................................................. G03B 3/10
[52] U.S. Cl. ...................................... 250/204; 354/402
[58] Field of Search .................. 250/204, 201; 354/25; 356/4

[56] References Cited

U.S. PATENT DOCUMENTS

4,171,155 10/1979 Jyoiki et al.
4,314,151 2/1982 Suzuki et al.
4,331,864 5/1982 Nakajima et al.
4,352,545 10/1982 Uno et al. .......................... 354/25

FOREIGN PATENT DOCUMENTS

2750735 5/1979 Fed. Rep. of Germany.

Primary Examiner—William L. Sikes
Assistant Examiner—Darwin R. Hostetter
Attorney, Agent, or Firm—Fleit, Jacobson, Cohn & Price

[57] ABSTRACT

An automatically focussed optical system in which two arrays of photosensitive detectors have different optical spacings respectively in front of and behind the image plane of the system, and sense different portions of the image. Differences in electrical signals generated by adjacent detectors (C,D and E,F) in each set, and indicative of differences in intensity of the corresponding portions, are processed to generate a focus drive signal (Fd) of a value related to an error in the focus of the image. This signal is used to adjust the focus. Two discrete arrays of detectors (FIG. 2B) can be used or alternatively a single array (FIG. 2D) tilted relative to the image plane can be used. In another example (FIG. 2C) a transparent block is inserted adjacent to a part only of a single detector array to thereby lengthen the optical path length of that part relative to the remainder of the array.

6 Claims, 9 Drawing Figures

AUTOMATICALLY FOCUSSED OPTICAL SYSTEM

The present invention relates to an automatically focussed optical system.

It is known to automatically focus the optical system of a hand-held photographic camera by measuring the distance from the camera to a subject and adjusting the focus accordingly. One known system uses an ultrasonic rangefinder, whilst another uses an optical rangefinder.

It is an object of the present invention to provide a focussing arrangement which derives a measure of focus from the content of the image of a scene.

According to the invention, there is provided an automatically focussed optical system, comprising:

means for focussing an image of a scene on an image plane;

means for producing signals representing the intensity of some adjacent portions of the image which have a predetermined optical spacing in front of the image plane and the intensity of other adjacent portions of the image which have a predetermined optical spacing behind the image plane;

means for forming, from the said signals representing intensity, a signal representing the error in the focus of the focussing means, the signal having a value which is a function of the differences in intensity of adjacent portions of the image and the differences between the differences in intensity derived from said some of the portions, and derived from said others of the portions; and means for adjusting the focus of the focussing means in dependence on the signal representing the focus error.

Figure 2:
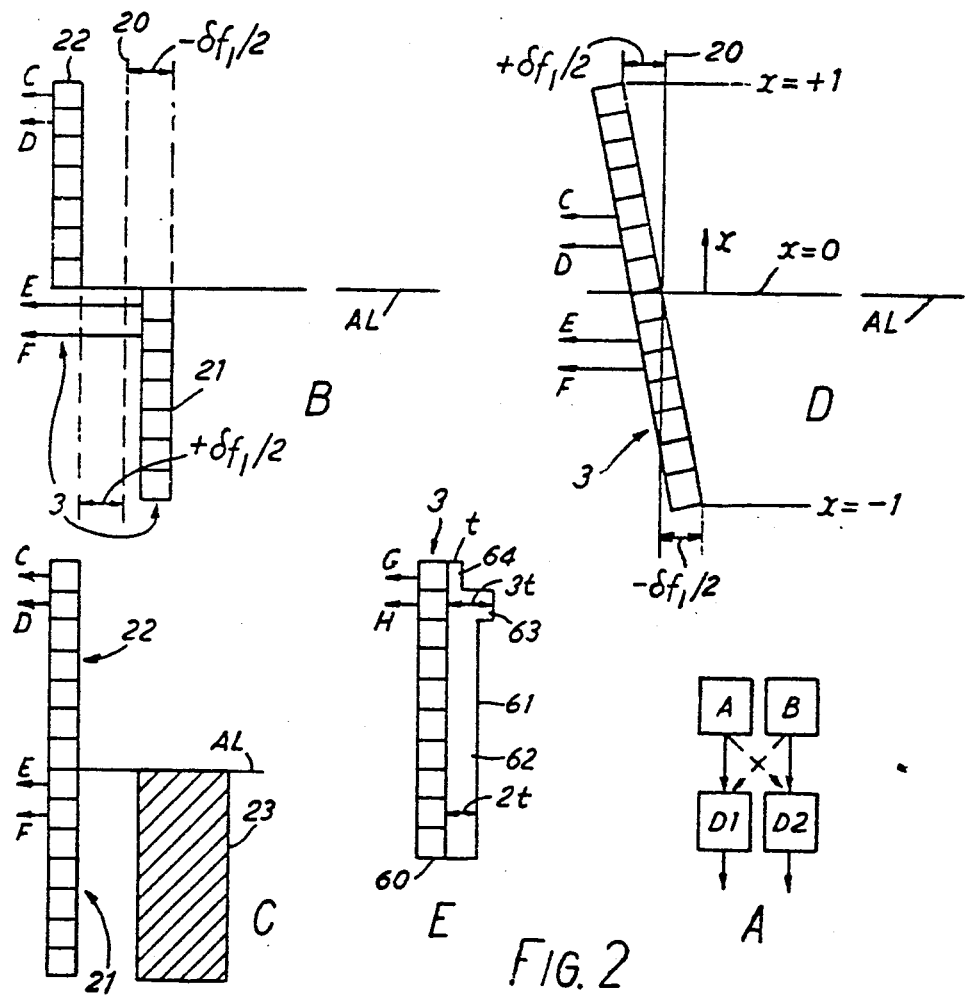
Figure 3:
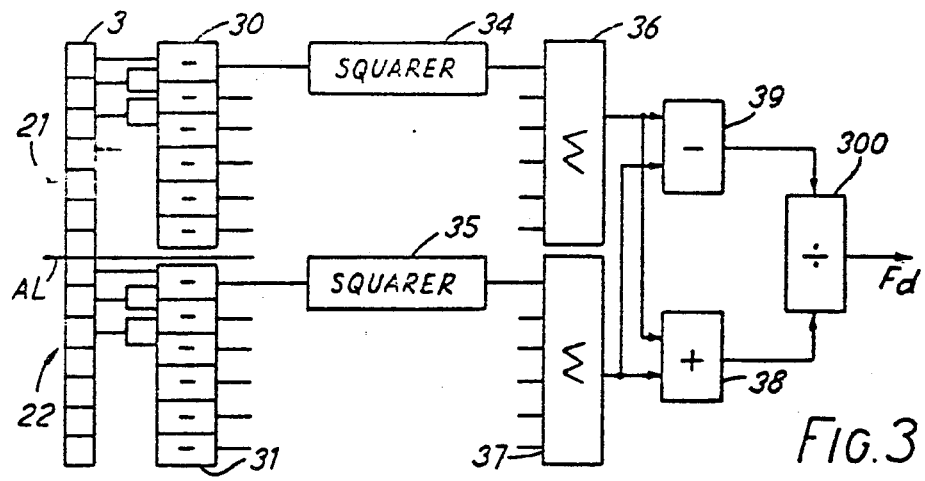
Figure 4:
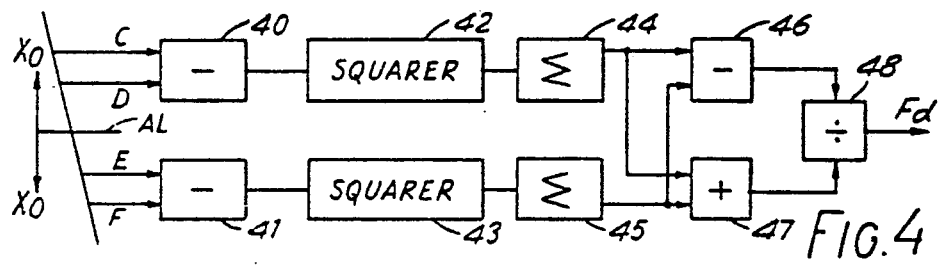
Figure 5:
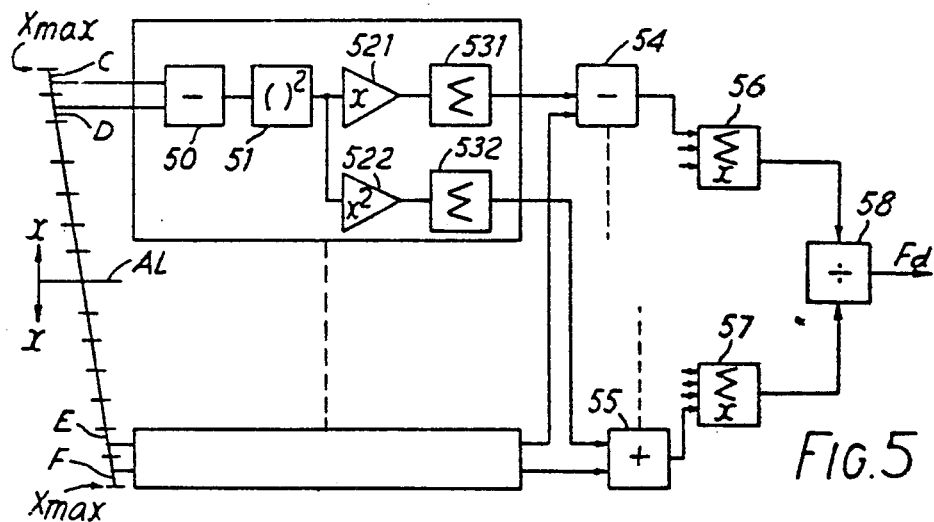

For a better understanding of the present invention, reference will now be made, by way of example, to the accompanying drawings, in which FIG. 1 is a schematic block diagram of an automatically focussed optical system, FIGS. 2A to E diagrammatically illustrate the configurations of electro-optic detectors which may be used in the system, and FIGS. 3 to 5 are schematic block diagrams of alternative circuits for generating a measure of focus.

Referring to FIG. 1, an example of an automatically focussed optical system comprises an optical arrangement 1 which is arranged to focus an image of a scene 2 onto an array of photo-sensitive detectors 3 arranged at an image plane. A scanning mechanism 4 causes the detectors to scan through the image in a manner known in the art. In this example the mechanism 4 causes the detectors to simultaneously scan a plurality of lines through the scene. The detectors 3 produce electrical signals representing the scene on a plurality of conductors 5, which feed the signals to a processor 6, which includes, for example, a standards converter which converts the signals to a conventional TV video signal for display.

The system as so far described is conventional. In accordance with the invention, a circuit 7 generates from the signals produced by the detectors, or from the video signal, a focus drive signal Fd of value related to of the error of the focus of the image of the scene, and feeds the signal Fd to a servo mechanism 8 which adjusts the optical arrangement 1 to correct the focus. Furthermore, in accordance with the invention, the detectors 3 are arranged in a particular manner which facilitates the generation of the focus drive signal Fd. Examples of the arrangement of the detectors and of the circuit 7 for generating the focus drive signal Fd will be described hereinafter in relation to a system which derives the signal Fd from the signals produced by the detectors on the lines 5.

Firstly, the background to the invention will be explained. Referring to FIG. 2A, the image of the scene is projected onto the array 3 of detectors and adjacent detectors D1 and D2 of the array 3 have intensities A and B projected onto them assuming the focus of the optical arrangement is perfect. If the focus is imperfect, the image tends to blur or spread out so that the outputs d1 and d2 of the detectors D1 and D2 may be represented as $$d1 = A + aB \quad d2 = B + aA$$

where $a$ is a function of the focus.

Because the image will change in the same way irrespective of the direction in which the focus changes $a$ is an even function of focus error $f$, for which a simple approximation is $$a = a_o + \beta f^2$$

where $a_o$ and $\beta$ are constants.

The difference $\Delta$ between the outputs of the detectors D1 and D2 is $$\Delta = (A + aB) - (aA + B)$$
$$= (1 - a)(A - B)$$

from which it is evident that the better the focus, the greater the value of $\Delta$, the difference between the outputs.

It follows that the rate of change of difference $\Delta$ with the focus error is $$\frac{\delta \Delta}{\delta f} = -2(A - B)\beta f$$

from which $$f = \frac{-1}{2\beta \delta f} \cdot \frac{\delta \Delta}{(A - B)} . \qquad \text{equation 1}$$

In practice, noise will be present so that $\delta \Delta$ will be contaminated by noise having an r.m.s. value of $\sigma$. In general, $(A-B) >> \sigma$ so that the r.m.s. error in the inferred value of f will be $$\frac{1}{2\beta \delta f} \cdot \frac{\sigma}{(A - B)} . \qquad \text{equation 2}$$

The required shift in the focus will be estimated by observing the differences, not between just two detectors D1 and D2, but between a larger number N of pairs of adjacent detectors. It is a standard result in statistics that the variance of a weighted mean is minimum when the weights are made inversely proportional to the variances of the corresponding observations. Therefore, the optimal weight W to apply to the value of f derived from A and B is from equation 2:

$$W = 4\beta^2(\delta f)^2 \cdot \frac{(A-B)^2}{\sigma^2} \quad \text{equation 3}$$

The corresponding weighted mean value of $f$ is given by $$F = \frac{\Sigma W \cdot f}{\Sigma W}$$

from which the weighted mean value of F derived from N pairs of adjacent detectors is thus $$F = \frac{-1}{2\beta\delta f} \cdot \frac{\sum_N (A-B)\delta\Delta}{\sum_N (A-B)^2} \quad \text{equation 4A}$$

$$F = k \cdot \frac{\sum_N (A-B)\delta\Delta}{\Sigma (A-B)^2} \quad \text{equation 4B}$$

where K is a constant scaling factor and $\Delta = (1-\alpha)(A-B)$. In the vicinity of optimal focus $(1-\alpha)$ will approximate to 1. Thus $(A-B)$ is approximately $\Delta$ and so an approximation is $$F = k \frac{\sum_N \Delta\delta\Delta}{\sum_N \Delta^2} \quad \text{equation 4C}$$

hence, a good approximation to the focus drive is $$Fd = \frac{\sum_N \delta(\Delta^2)}{\sum_N \Delta^2} \quad \text{equation 5}$$

where $\delta\Delta$ is the change in $\Delta$, the difference between the outputs of adjacent detectors D1 and D2, as the focus changes.

Equation 4A, 4B, 4C or 5 is an approximation to the value of the drive signal for controlling focus. Examples of the arrangements of the detector array 3 and of the circuit 7 which operate in accordance with that equation 5 will now be described.

Referring to FIG. 2B, reference 20 denotes an image plane for optimal focus of the optical arrangement 1. The array of detectors 3, comprises a line of detectors 21 placed at a preset distance $+\delta f_1/2$ in front of the plane 20 above an arbitarary line AL perpendicular to the image plane and a further line 22 placed at a preset distance $-\delta f_1/2$ behind the plane 20, the detectors scanning the image along lines perpendicular to the plane of the drawing. The difference in the outputs of two adjacent detectors E, F of line 21 and the difference of two adjacent detectors C, D of line 22 give values of $\Delta$ namely $\Delta_{EF}$ and $\Delta_{CD}$ for two pairs of detectors E, F, and C, D. The difference between $\Delta_{EF}$ and $\Delta_{CD}$ gives a value of $\delta\Delta$, for a variation in focus of $\delta f_1$.

Referring to FIG. 2C, instead of relatively displacing the halves of the array 3 above and below the line AL, the optical path length to one half, e.g. the half below the line AL, can be lengthened by $\delta f_1$ by the insertion into the optical arrangement of a parallel sided transparent (e.g. glass for visible light) block 23 adjacent the lower half of the detector array.

FIG. 3 is a block diagram of an example of the circuit 7 for use in conjunction with the arrangement of detectors shown in FIGS. 2B and 2C.

If $A^+$ and $A^-$ and $B^+$ and $B^-$ denote the contents of respective particular adjacent pixels A, B when the focal length is the optimal length $L \pm$ an error $\delta f_1/2$ i.e. $(L + \delta f_1/2)$ and $(L - \delta f_1/2)$, respectively, then $$\delta\Delta - (A^+ - B^+) - (A^- - B^-)$$

so that
$$\Sigma(A-B)\delta\Delta = \Sigma(A-B)(A^+ - B^+) - \Sigma(A-B)(A^- - B^-)$$

Now the principle upon which the arrangement of FIG. 3 is based is that if the picture frame is divided into two equal sets of thin, interleaved parallel slices, the statistics of the two sets would always be very similar. If one set were (permanently) set off-focus by $\delta f_1/2$ and the other set by $-\delta f_1/2$ and if adjacent pixels in the first set are denoted C, D and the second set E, F then it follows that $$\sum_N (A-B)(A^+ - B^+) - \sum_N (A-B)(A^- - B^-)$$
$$= 2\sum_{N/2}(C-D)^2 - 2\sum_{N/2}(E-F)^2$$

In particular, by analogy with eqn (5) above the required drive will be $$Fd = \frac{-1}{2\beta\delta f_1} \left\{ \frac{\sum_{N/2}(C-D)^2 - \sum_{N/2}(E-F)^2}{\sum_{N/2}(C-D)^2 + \sum_{N/2}(E-F)^2} \right\} \quad \text{equation 6}$$

Referring to FIG. 3, the outputs of the line 21 of detectors of the array 3 above the line AL are fed in parallel to an array 30 of differencing circuits and those of the line 22 below the line AL to another such array 31. The differencing circuits form the differences $\Delta$ between the outputs of adjacent detectors, and these differences $\Delta$ are squared in squarers 34 and 35, to form $\Delta^2$ and summed to form $\Sigma\Delta^2$ in summing circuits 36 and 37, the period of summing being, for example, the time to scan the whole image once.

The outputs of the summing circuits are fed to an adder 38 to form the denominator of equation 6 and to a subtractor 39 to form the numerator of equation 6. Finally, the outputs of the adder and subtractor are fed to a divider 300 to form the focus drive $F_d$.

Referring to FIG. 2D, there is shown a linear detector array 3 which, instead of having two halves having different path lengths to the optical arrangement 1 as in FIGS. 2B and 2C, is inclined relative to the image plane 20. Such an arrangement is simpler to construct than the arrangements of FIGS. 2B and 2C but makes less efficient use of the detectors in focussing. The array 3 is inclined such that the centre of its photosensitive face intersects the image plane and the arbitrary line AL at a point $x=0$ the ends of that face being displayed from the image plane by $+\delta f_1/2$ at $x=+1$ and by $-\delta f_1/2$ at $x=-1$.

Considering pairs of adjacent detectors C, D and E, F situated arbitrary distance $\pm x$ from the line AL, the focus drive $F_d$ is $$F_d = \frac{-1}{2\beta\delta f}\left\{\frac{\sum\limits_M x(C-D)^2 - \sum\limits_M x(E-F)^2}{\sum\limits_M x^2(C-D)^2 + \sum\limits_M x^2(E-F)^2}\right\}$$

For only two pairs of detectors C, D and E F situated at a predetermined distance $\pm X_o$ from the line AL, equation 7
$$F_d = \frac{-1}{2\beta\delta f} X_o\left\{\frac{\sum\limits_M (C-D)^2 - \sum\limits_M (E-F)^2}{\sum\limits_M (C-D)^2 + \sum\limits_M (E-F)^2}\right\}$$

FIG. 4 is a block diagram of a circuit operating in accordance with equation 7. The outputs of the detectors C, D are fed to a subtractor 40 and the outputs of the detectors E, F are fed to a subtractor 41. The differences formed by the subtractors are squared in squarers 42 and 43, and the squared differences integrated in summers 44 and 45, the period of summation being, for example, the time to scan the whole image once. The outputs of the summers are fed to a subtractor 46 which forms a signal of value related to the numerator of equation 7, and to an adder 47 which form a signal of value related to the denominator of equation 7. Finally, a divider 48 forms the focus drive $F_d$ in accordance with equation 7.

The circuit of FIG. 4 and equation 7 takes account of the outputs of only two pairs of detectors at predetermined distances $\pm X_o$ from the line AL. FIG. 5 shows a circuit which takes account of all the detector outputs at all distances x from the arbitrary line AL. The circuit of FIG. 5 operates according to the equation equation 8
$$F_d = \frac{-1}{2\beta\delta f}\left\{\frac{\sum\limits_x\left[\sum\limits_M x((C-D)^2 - (E-F)^2)\right]}{\sum\limits_x\left[\sum\limits_M x((C-D)^2 + (E-F)^2)\right]}\right\}$$

Referring to FIG. 5, consider a pair of adjacent detectors C, D. The outputs of these detectors feed a channel comprising a subtractor 50 for forming the difference $(C-D)$ followed by a squarer 51 which forms a value $(C-D)^2$. An amplifier 521 multiplies $(C-D)^2$ by a value of x corresponding to the distance of C, D from the line AL and an amplifier 522 multiplies $(C-D)^2$ by $x^2$. Integrators 531 and 532 integrate the outputs of the amplifiers 521 and 522 for a time equal for example to the time to scan the whole image once to form signals of values related to $\Sigma x(C-D)^2$ and $\Sigma x^2(C-D)^2$ for x=a fixed value, say X max for C, D and E, F as shown in FIG. 5. Many other similar channels are provided, the channels differing only in the gains of the amplifiers, which gains correspond to the positions of the detectors associated with the channels. The outputs of the integrators of each pair of channels which are associated with detector pairs equidistant from, but on opposite sides of, the line AL are fed to subtractors 54, to form signals of value related to $$\sum\limits_M x[(C-D)^2 - (E-F)^2]$$

and to adders 55 to form signals of value related to $$\sum\limits_M x^2[(C-D)^2 + (E-F)^2]$$

for a fixed value of X, say X max for C, D and E, F as shown in FIG. 5.

The outputs of all the subtractors are summed in a summer 56 and the outputs of all the adders are summed in a summer 57 to form the numerator and denominator of the equation 8, and a divider 58 forms the focus drive $F_d$ in accordance with equation 8.

In the above described examples, detectors are adjacent one another in a direction (hereinafter called the field direction) perpendicular to the line scan direction, and the differences between the outputs are differences taken in the field direction. If desired, however, the differences could be formed from the output of a single detector as it scans the image in the line scan direction, the differences then representing the difference between adjacent pixels of the image in the line scan direction.

In some detector arrays, groups of detectors are aligned in the line scan direction. In such a case, the differences corresponding to $(C-D)$ and $(E-F)$ may be derived from detectors which are adjacent in the line scan direction.

In general, for any two dimensionally scanned image, differences such as $(C-D)$ and $(E-F)$ can be formed in the line scan direction and/or in the field direction using pairs of detectors which are adjacent in the line scan direction and/or the field direction or by forming the difference between the output of a single detector at two adjacent positions in the scan.

FIG. 2E shows a detector array 3 for use in the situation where differences analogous to $(C-D)$ and $(E-F)$ are formed in the line scanning direction using single detectors G and H respectively.

The detector array of FIG. 2E comprises a linear array of detectors 60 on the photosensitive face of which is placed an optically transparent member 61. A portion 62 of uniform thickness say 2 t covers all the detectors except G and H, whereas detector H is covered by an integral portion 63 of thickness 3 t and detector G is covered by an integral portion of thickness t. Thus if the detector array 3 is positioned so that the detectors associated with portion 61 are in the image plane, detector G is effectively spaced in front of the image plane by an amount related to t and detector H spaced behind it by the same amount.

Of course, a pair of adjacent detectors arranged in the same way as detector G and a further pair of adjacent detectors arranged in the same way as detector H could be provided so as to produce differences like $(C-D)$ and $(E-F)$ in the field direction.

Furthermore, it is possible to form the differences such as $(C-D)$ and $(E-F)$ from adjacent detectors in a non-scanned array.

In a modification of the arrangement of FIG. 2C, the block 23 is reciprocated parallel to the image plane into and out of the optical path so as to intermittently produce the value of focus error.

Although an optimal weighting function based on the statistics of noise has been described above, other weighting functions may be used.

What I claim is:

1. An automatically focussed optical system comprising means for focussing an image of a scene onto an image plane,
   a single array only of detectors lying in a common plane, some of the detectors being capable of generating respective electrical output signals representing the intensity of radiation at portions of the image having a predetermined optical spacing in front of the image plane, and others of the detectors being capable of generating respective electrical output signals reresenting the intensity of radiation at different portions of the image having a predetermined optical spacing behind the image plane,
   and a processing circuit responsive to said electrical signals to generate a focus signal representing an error in the focus of the focussing means, the focus signal having a value which is related both to differences of intensity of adjacent said portions of the image having said predetermined optical spacing in front of the image plane and to differences of intensity of adjacent said portions of the image having said predetermined optical spacing behind the image plane,
   and means for adjusting the focus of the focussing means in dependence on the focus signal.

2. An automatically focussed optical system comprising means for focussing an image of a scene onto an image plane, a single array only of detectors which lie in a common plane parallel to the image plane, an optically transparent block of uniform thickness overlying some of the detectors in the array thereby to increase the optical path length between said some of the detectors and the focussing means, said some of the detectors being capable of generating respective electrical output signals representing the intensity of radiation at portions of the image having a predetermined optical spacing behind the image plane and others of the detectors being capable of generating respective electrical output signals representing the intensity of radiation at different portions of the image having a predetermined optical spacing in front of the image plane,
   and a processing circuit responsive to said electrical signals to generate a focus signal representing an error in the focus of the focussing means, the focus signal having a value which is related both to differences of intensity of adjacent said portions of the image having said predetermined optical spacing in front of the image plane and also to differences of intensity of adjacent said different portions of the image having said predetermined optical spacing behind the image plane, and means for adjusting the focus of the focussing means in dependence on the focus signal.

3. An automatically focussed optical system according to claim 2 including means for moving said optically transparent member parallel to the image plane and into and out of the optical path between said some of the detectors and the focussing means.

4. An automatically focussed optical system comprising means for focussing an image of a scene onto an image plane, a single array only of detectors which lie in a common plane inclined relatively to the image plane so that some of the detectors in the array are capable of generating respective electrical output signals representing the intensity of radiation at portions of the image having different predetermined optical spacings in front of the image plane and others of the detectors are capable of generating respective electrical output signals representing the intensity of radiation at portions of the image having different predetermined optical spacings behind the image plane,
   and a processing circuit responsive to said electrical signals to generate a focus signal representing an error in the focus of the focussing means, the focus signal having a value which is related both to the differences of intensity of adjacent said portions of the image having said predetermined optical spacings in front of the image plane and also to the difference of intensity of adjacent said portions of the image having said predetermined optical spacings behind the image plane,
   and means for adjusting the focus means in dependence on the focus signal.

5. An automatically focussed optical system according to claims 1, 2, 3, or 4 wherein said focus signal has a value related to the difference of the respective sums of the squares of said differences of intensity of adjacent said portions of the image having predetermined optical spacings in front of and behind the image plane.

6. An automatically focussed optical system comprising,
   means for focussing an image of a scene onto an image plane, a single array only of detectors lying in a common plane, parallel to the image plane, means for scanning the array across the scene, an optically transparent member overlying said array and having regions of different thickness, at least one detector in the array being capable of generating an electrical output signal representing the intensity of radiation at a corresponding portion of the image having a predetermined optical spacing in front of the image plane and at least one other detector being capable of generating an electrical output signal representing the intensity of radiation at a corresponding portion of the image having a predetermined optical spacing behind the image plane,
   and a processing circuit responsive to electrical signals, produced when said at least one detector and said at least one other detector are scanned across the scene, to generate a focus signal representing an error in the focus of the focussing means, the focus signal having a value which is related both to differences of intensity of radiation at adjacent portions of the image having said predetermined optical spacing in front of the image plane, and to differences of intensity of radiation at adjacent portions of the image having said predetermined optical spacing behind the image plane, and means for adjusting the focus of the focussing means in dependence on the focus signal.

* * * * *